United States Patent
Bolle et al.

(10) Patent No.: US 6,301,440 B1
(45) Date of Patent: Oct. 9, 2001

(54) SYSTEM AND METHOD FOR AUTOMATICALLY SETTING IMAGE ACQUISITION CONTROLS

(75) Inventors: Rudolf M. Bolle, Bedford Hills; Jonathan H. Connell, Cortlandt-Manor; Arun Hampapur, White Plains; Andrew W. Senior, New York, all of NY (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/549,023

(22) Filed: Apr. 13, 2000

(51) Int. Cl.[7] .................................................. G03B 13/00
(52) U.S. Cl. ...................... 396/128; 396/429; 348/229; 348/232
(58) Field of Search .................................. 396/125, 128, 396/322, 319, 374, 236; 348/232, 233, 229, 230, 362–366; 355/38, 40, 67–69, 77

(56) References Cited

U.S. PATENT DOCUMENTS

| | | | |
|---|---|---|---|
| 5,025,282 | * 6/1991 | Nakamura et al. | 355/38 |
| 5,726,737 | * 3/1998 | Fredlund et al. | 355/40 |
| 5,860,039 | * 1/1999 | Kusumoto | 399/51 |
| 5,889,578 | * 3/1999 | Jamzadeh | 355/38 |

FOREIGN PATENT DOCUMENTS 9-172571 * 6/1997 (JP).

OTHER PUBLICATIONS

Flickner, et al., Query by Image and Video Content: The QBIC System, IEEE Computer, vol. 28, No. 9, Sep. 1995.*

A Highly Efficient System for Automatic Face Region Detection in MPEG Video, IEEE Transactions on Circuits and Systems for Video Technology, vol. 7, No. 4, Aug. 1997.*

D. Cowell, Probabilistic Networks & Expert Systems, Springer, 1999 XII, 321, pp. 45.*

* cited by examiner

Primary Examiner—D. Rutledge
(74) Attorney, Agent, or Firm—McGuireWoods, LLP; Louis J. Percello

(57) ABSTRACT

A system and method use computer image processing for setting the parameters for an image acquisition device of a camera. The image parameters are set automatically by analyzing the image to be taken, and setting the controls according to the subject matter, in the same manner as an expert photographer would be able to. The system can run in a fully automatic mode choosing the best image parameters, or a "guided mode" where the user is prompted with choices where a number of alternate settings would be reasonable.

56 Claims, 3 Drawing Sheets

SYSTEM AND METHOD FOR AUTOMATICALLY SETTING IMAGE ACQUISITION CONTROLS

BACKGROUND OF THE INVENTION

1. Field of the Invention

The present invention generally relates to expert systems applied to computer image processing, and more particularly to computer image processing for automatically adjusting the controls of a camera according to the object framed by the user. The camera may be a still camera or a video camera.

2. Background Description

Electronic cameras are sophisticated devices with various controls for affecting the manner in which a photograph is taken. Traditional electronic cameras have limited controls for adjusting focus, aperture, shutter speed and, in some cases, lens focal length. Later-generation cameras are more sophisticated, adjusting parameters that include focus point for an auto-focus camera, meter weighting for exposure control, f-stop correction, depth-of-field, electronic flash parameters, number of exposures composing a given image, and more.

In spite of their increased functionality, conventional cameras as discussed above have significant drawbacks. These cameras, for example, require a user to exert an overwhelming degree of control over the picture-taking process in terms of correctly setting the camera parameters. This usually proves too great a task for the amateur photographer. As a result, photographs are often taken with inappropriate settings and thus tend to be of poor quality. For the novice user especially, such sophistication is too intimidating. Even when the camera controls are hidden, either in simple cameras or in simple modes where everything is automatic, poor photographs may still result because the user does not have the knowledge of photography or the control to compensate for backlighting, to set the depth-of-field appropriately, and the like.

Previous attempts to solve these problems involved automating functions or abstracting parameters into a different space. Auto-focus, automatic exposure (e.g., U.S. Pat. No. 5,860,039 to Kusumoto Keiji) and depth-of-field selection are all attempts at simplification, but in some ways they have added to the problem of overwhelming complexity instead of helping to solve it. Let us take auto focus as an example. Earlier cameras needed to be manually focused. Modern cameras, however, are almost always auto-focused. However, in such simplified cameras where the focus control is removed from the user, there is no simple way to specify which object in the scene should be focused upon, resulting in pictures where an off-center subject is out of focus. Sophisticated cameras tackle this problem by reintroducing some complexity—a focus lock button, or manual selection of the focus point. There is still, however, a control for focus; it is just specified in a different manner.

In particular domains of photography, special sets of parameters will be chosen. For sports photography, high speeds are necessary. For close-up images, the depth-of-field needs to be controlled well. For night photography, a flash must be used. An expert photographer will have a good knowledge of how to control the camera for many of these settings. Previous attempts have been made to encapsulate this knowledge in modules (such as used by Minolta cameras), but the expert still needs to know which module is the most appropriate for a situation, be in possession of the correct module, insert it in the camera, adjust the parameters of the module and so forth.

In view of the foregoing considerations, it is clear that cameras in existence today have complex controls which, at best, are burdensome to their users and result in photographs being taken of non-optimal quality. A need therefore exists for an automatic system and method, implemented preferably in highly sophisticated electronic cameras, which either automatically sets camera parameters at optimal settings and/or which gives the user the ability to set those parameters in an easy and efficient manner as compared with conventional devices.

SUMMARY OF THE INVENTION

It is therefore an object of the present invention to provide an improved system and method for setting the parameters for an image acquisition device of a camera.

This and other objects of the invention are achieved by providing a system and method which analyzes an image to be taken in the same manner as an expert photographer would and then sets the image acquisition parameters according to a derived class of the subject matter. According to the invention, a temporary image acquisition unit acquires a temporary image, a scene analysis unit extracts information from the temporary image and generates at least one scene hypothesis from the extracted information, a photographic expert unit adjusts image capture parameters based on the scene hypothesis, and a permanent image acquisition unit acquires a permanent image based on the image capture parameters adjusted by the photographic expert unit. The extracted information may include at least one of image features, scene components, classifications, or imaging parameters. The image capture may include one or more of the following: focus distance, aperture, shutter speed, zoom, filter application, filter parameters and imager sensitivity.

In one embodiment, the temporary image acquisition unit and permanent image acquisition unit may be the same unit. Advantageously, the system can run in a fully automatic mode choosing the best image parameters, or a "guided mode" where the user is prompted with choices where a number of alternate settings would be reasonable. Also, mapping between input characteristics and image parameters may be learned automatically by the photographic expert unit observing settings input by the user for different kinds of images.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
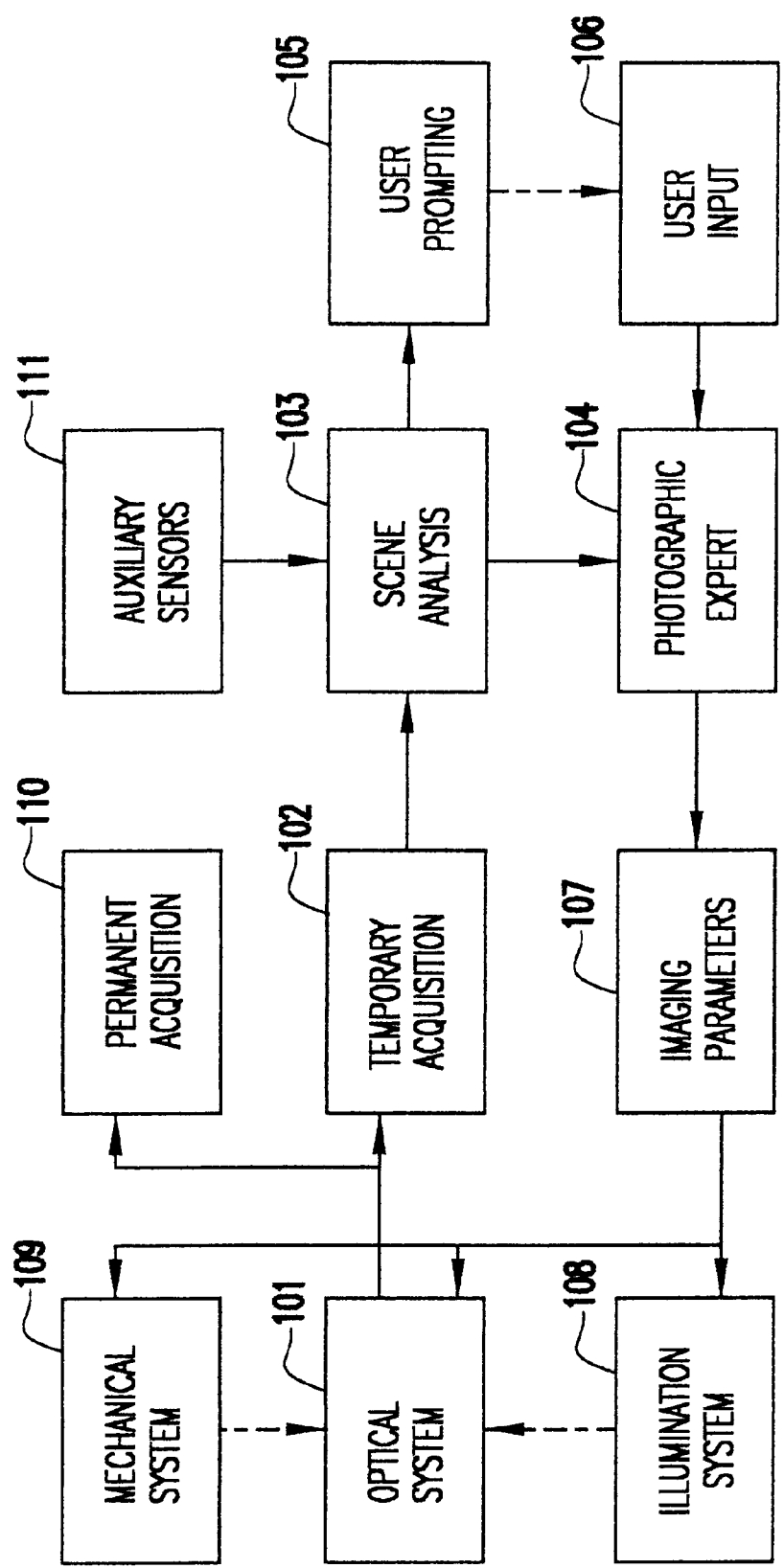
FIG. 1 is a block diagram of a preferred embodiment of the system of the present invention.

Referring now to the drawings and more particularly to FIG. 1, a preferred embodiment of the system of the present invention includes an optical system 101, an image acquisition device 102, a scene analysis unit 103, and a photographic expert 104. The optical system 101 controls an image acquired by the image acquisition device 102. Scene analysis unit 103 then extracts certain information about the image acquired by the device 102. The photographic expert 104 determines the type of photograph that the user is trying to take based on the information from the scene analysis unit, either alone or in conjunction with inputs from auxiliary sensors 111 such as ambient temperature or camera tilt angle. Expert 104, then, indicates its understanding of the scene to the user through some prompt or display method 105 and the user can give feedback, override to the expert, or take full manual control through some input device 106. The user prompt 105 and the user input 106 together constitute a user interface by which the photographic expert 104 and the user can communicate.

When the user commits to taking the photograph, the photographic expert 104 sets the imaging parameters 107. These include such basic controls as exposure and/or any one or more of optical parameters 101 such as aperture and focus and mechanical parameters 109 such as pan, tilt, zoom, and shutter release timing. Expert 104 may also actuate an illumination system 108 such as a flash. Then, a final image is saved by the permanent acquisition unit 110. For a conventional still camera, this step would involve exposing the film. For a digital camera, it would involve saving the data from the imager to some sort of memory. The temporary image acquisition device 102 and the permanent image acquisition device 110 may be the same unit.

Moreover, the temporary acquisition unit may be a CCD or CMOS imaging array acquiring a digital color image, allowing a digital computer to process and analyze the scene image. For a digital still or video camera system, this imaging array would be used for the permanent and temporary image acquisition. For a conventional still or movie camera, the permanent image would be captured on conventional film. For a video camera, a permanent storage medium might be video tape or a hard disk drive. However, other configurations may be apparent to those skilled in the art. For example, a scanner may be used to acquire the temporary or permanent image from a hard-copy; imaging devices operating in other bands of the electromagnetic spectrum; and sound spectrum or other sensing technologies. A plurality of sensors may be used to acquire images simultaneously.

If the photographic expert 104 receives user feedback, a decision override, or manual control inputs, it uses this to learn user preferences (or optionally store the inputs directly) and then automatically apply similar corrections to future analogous imaging situations.

In addition to the above, the photographic expert 104 may include a storage medium for recording non-pictorial information pertaining to each individual picture taken by the user. This information may include the imaging parameters of the picture, a simple index or a semantic digest of the image for accessing or finding the information at a later time.

Figure 2:
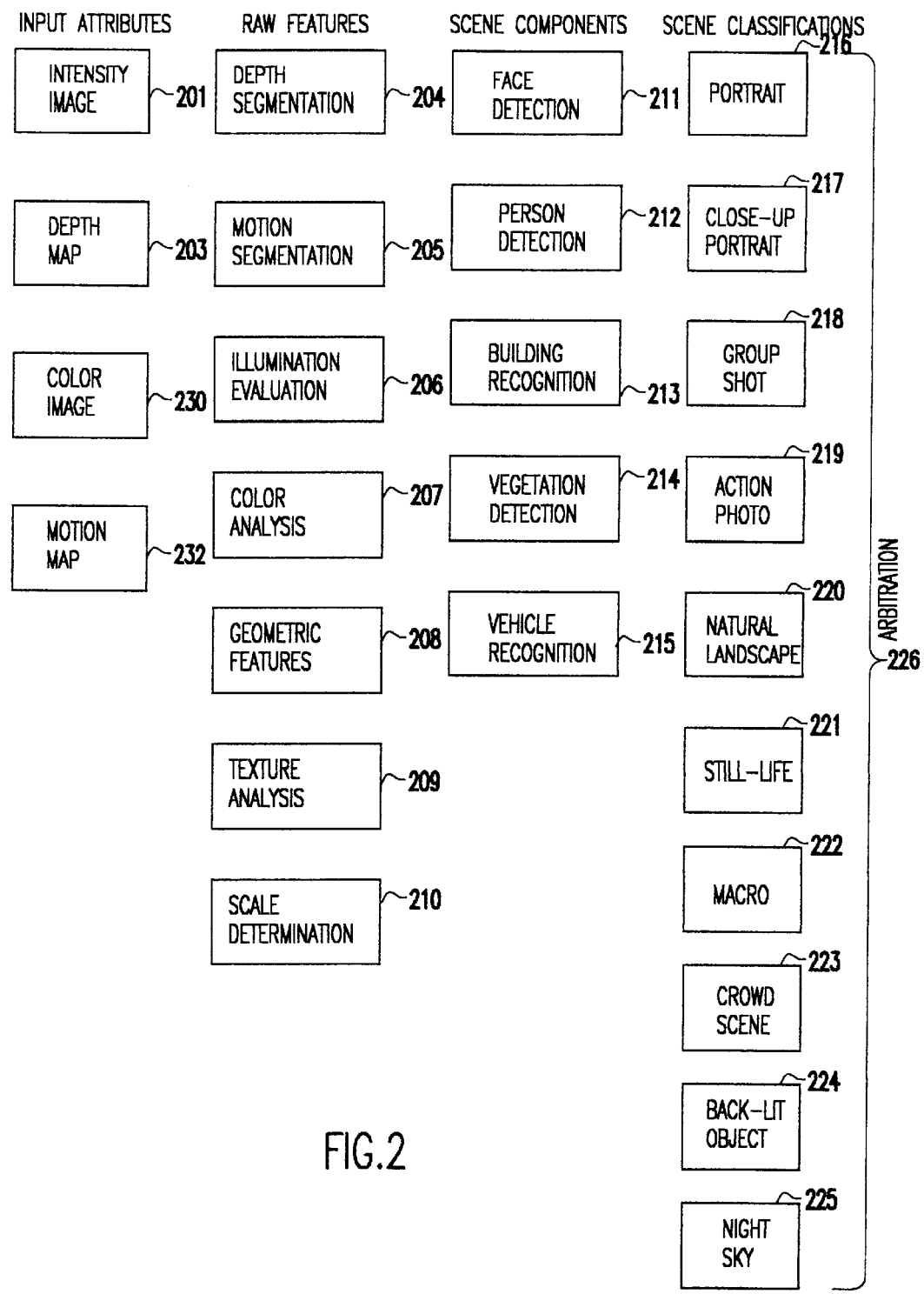
FIG. 2 is a block diagram of a scene analysis performed in accordance with the preferred embodiment of the present invention.

The preferred embodiment of the present invention employs scene analysis 103 the details of which are shown in FIG. 2. Scene analysis includes four components: input attributes, raw features, scene components, and scene classifications. From the input attributes, the scene analysis unit first extracts raw features. These form the basis for finding and identifying scene components, which in turn are used to generate one or more scene classifications. Such classifications are the output of the scene analysis unit.

In particular, the input attributes may include image intensity 201, a depth map 203, image color 230, and a motion map 232. The raw features may include depth map segmentation 204, motion segmentation 205, illumination evaluation 206, color analysis 207, geometric features 208, texture analysis 209, and scale determination 210. The scene components may include face detection 211, person detection 212, building recognition 213, vegetation detection 214, and vehicle recognition 215. Final scene classifications may include portrait 216, close-up portrait 212, group shot 213, action photo 219, natural landscape 220, still life 221, macro 222, crowd scene 223, backlit object 224, and night sky 225. As described in more detail below, the scene classifications correspond to one or more hypotheses as to the type of scene the user intends to photograph based on the raw features and scene components. If there are multiple hypotheses, a scene classification arbitration method 226, is applied to select the most likely hypothesis.

Consider, first, a scene in which one or more persons are present. The person detector 212 determines whether there are people in the scene. This step may be performed in accordance with any number of conventional techniques. Similarly, face detection 211 could be implemented by facial profile detection, skin-tone detection, etc. These classifications may also be parameterized with additional information such as location, average illumination, velocity, etc. such as "Face at position (x, y) with width W", or "Landscape with horizon at height y."

Such a scene component module using one or more of these techniques could determine the sizes and locations of all the people in the scene. A subsidiary part of the scene analyzer could process the output of the person detector 212 to determine the type of "person" scene that is being imaged. In one embodiment, simple rules would give the classification; e.g., one large face implies "close-up portrait" 217; one small face and entire body implies "portrait" 217; many small faces nearly filling the image implies "crowd scene" 223; several medium to large faces in the central portion of image implies "group shot" 218; a few small figures implies some other mode —although people are present, they are not the subject of the photography. A preferred embodiment would have a more sophisticated classifier, such as a neural network processing the input data (e.g., x, y location, size, amount of body present for each person) from the person detector 212 and classifying scenes into a larger set of person categories.

Another scene component recognizer 213 determines whether there are buildings in the scene based on geometric features 208. For instance, many straight lines and corners often indicate buildings. Vehicle recognition 215 also recognizes a vehicle by geometric features 208, for example, a pair of dark circular objects, i.e., the tires.

Sunset detection has frequently been used as an example of effective content-based image analysis, and can be detected by spatial distribution of colors, 230. See, for example, Flickner et al., "Query by Image and Video Content: The QBIC System", IEEE Computer, Vol. 28, No. 9, 1995. Such a determination might imply either the "natural landscape" 220 or "backlit object" 224 categories as the output. Vegetation detection 214 detects vegetation using well-known techniques, combining color attributes 202 and texture features 209. Similarly, sky and clouds can be detected from the same modalities. In combination, these two scene components suggest the "natural landscape" category 220.

Motion segmentation 205 may be used to detect large moving objects, suggesting the presence of a person 212 or a vehicle 215. Image correspondence techniques, such as are used in the field of stereopsis, can separate out any motion caused by camera shake or independent camera motion. Alternatively, input from an auxiliary sensor 111 such as an accelerometer could be used to directly compensate for these effects.

Analysis of the pattern of shadows in an image 206 can be used to determine if a subject is poorly lit.

The final stage of the scene analysis is a scene classification arbitration process 226. This serves to reduce the number of hypotheses to a single best choice or a small number of alternatives. Some scenes result in multiple hypotheses, which may be combined into a composite hypothesis with individual characteristics. Other hypotheses are distinct, but not competitive, since they would result in similar imaging parameters, such as a person and statue at the same distance, with similar lighting. A rule-based or statistical system (such as a Bayesian belief network; cf. D. Cowell, *Probabilistic Networks & Expert Systems*, Springer, 1999 XII, 321, pp. 45) combines the outputs of these detectors to combine and arbitrate between the various scene hypotheses.

The simplest case is a prioritized hierarchy. Suppose there were rules such as following: fast-moving object which is a person implies "athlete" sub-category of "action photo" 219; fast-moving car object implies "motor sports" subcategory of "action photo" 219. In each of these categories, the likely additional "crowd scene" 223, classification would be directly suppressed (a kind of arbitration) by this dominant category.

Figure 3:
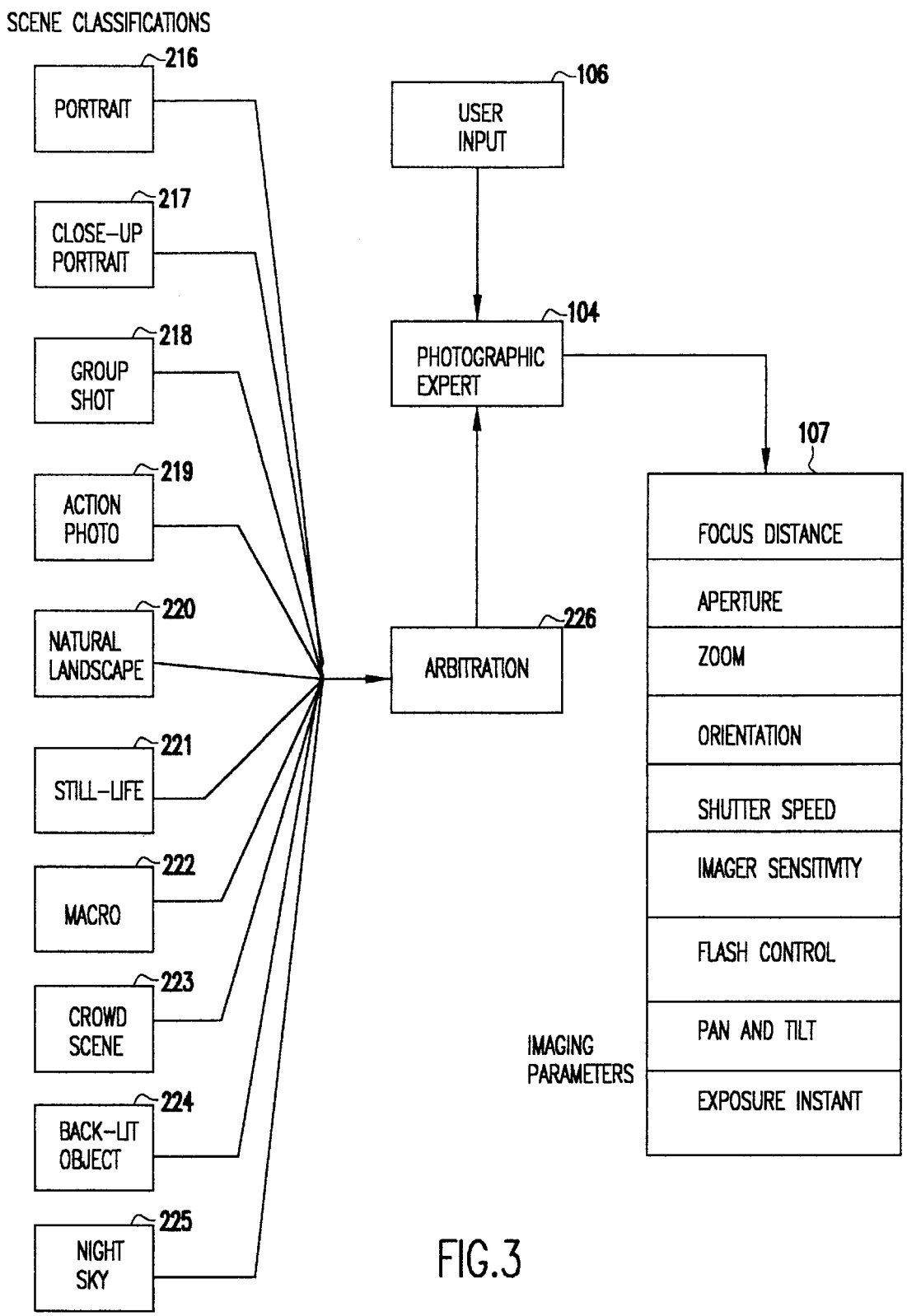
FIG. 3 is a block diagram of the photographic expert in accordance with the present invention.

As shown in FIG. 3, the photographic expert, 104, takes whatever the final decision of the scene arbitration unit 226 is and uses this to determine a set of values 107, for the imaging parameters in order to yield optimal image capture 301. The photographic expert embodies the domain knowledge of expert photographers as to which imaging parameters are appropriate to different types of subject matter.

The photographic expert may also base its decision on a number of other factors, such as the actual lighting conditions, the amount of camera-shake calculated (or directly measured), the depth of objects in the scene, and the like. Here again, a number of rules would suffice for a simple system, but a more sophisticated knowledge representation technique such as a neural network is used in the preferred embodiment because of the number of inputs and outputs to be interrelated and because of the complexity of those relations. Regardless of the actual embodiment, the system would perform tasks such as:

determination of a focus setting for the subject matter choice of a proper exposure for the subject region of the image selection of a shutter speed based on subject motion and camera stability Sometimes the scene arbitration unit, 226, will report several potential scene classifications instead of just one. In such cases the intent of the photographer is often not clear; for example, there might be two people at different depths. Here the photographic expert, 104, must choose a consistent set of imaging parameters in some way.

The camera may do this by having some default or "optimal" set of parameters for every situation, with certain hypotheses predetermined to override alternative hypotheses. For instance, it may choose the focus based on the nearest subject or always choose the depth-of-field to keep all subjects in focus when possible. This would be preferable for a camera in the "point-and-shoot" category or for a "zero intervention mode" of a more sophisticated camera.

However, for the more experienced user, the choices may be offered to the user through some user interface, 105. For instance, this interface may be a through-the-lens display panel or a camera-top liquid crystal display (LCD) panel. The user would then use simple controls, 106, such as the thumb-wheels or up/down buttons available on many present-day cameras, to select the category intended. In the preferred embodiment the "best-guess" hypothesis would be selected by default so that user intervention is kept to a minimum.

The camera may also report non-optimal conditions or anomalous situations to the user through the user prompting device, 105. For instance, if a cityscape was being taken the camera might alert the user to the fact that the building edges were not being imaged quite vertically. Or, it may indicate even higher level concepts: if a portrait was being taken the camera could suggest waiting a moment because the subject just sneezed.

The invention described herein is a suitable adjunct to any camera system. While it has been discussed with reference to a conventional still photography camera, the invention is also applicable to video cameras, medical imaging devices, telescopes, or any other image capture device. Therefore, it will be understood that the term "camera" is intended in its most generic meaning for all such image capture devices.

In typical operation, the user, or another system (e.g., a computer), composes a photograph in the conventional manner, pointing the camera at the desired subject and framing the picture using camera rotation and zoom. These are intuitive processes that every photographer understands and wishes to control. However, the user does not need to set any of the other imaging parameters, as would be normally required on a complex camera. When the trigger is activated, the camera then analyzes the picture that the user has composed, sets the imaging parameters to obtain a high quality image of this subject matter, and proceeds to take the photograph.

The camera may recognize many types of scenes, subjects and compositions, and control the camera parameters accordingly. These include but are not limited to: landscapes, portraits, buildings, man-made objects, seascenes, airplanes, cars, fast-moving objects, athletes, stage performance, specific landmarks or tourist attractions (e.g., the Eiffel tower), night sky, night scene, silhouette, macro photography, flowers, animals, and so on.

To improve performance, the camera may constantly assess the image content and imaging parameters as the image is composed, and then optionally give feedback to the user about its current analysis and recommendations. The user could optionally override the settings chosen by the camera or provide constraints either on the classes of scenes to be considered (e.g., this is some sort of outdoors picture), or on the actual imaging parameters selected (e.g., keep the shutter speed faster than 1/60 of a second).

While the above controls leave the picture composition in the hands of the photographer, just constraining imaging parameters to obtain the optimum quality of recorded image, the picture composition may also be controlled by the camera, or at the least the camera may suggest methods of improving the composition. A camera with a method of prompting the user may inform the user that the scene is backlit, hinting that if this is not the desired effect, that the novice user rearrange the subjects, if this is an option. When the composition is that of a portrait (by detecting a large face in the image), the camera can warn the user if part of that face is actually being cropped off. Similarly, for fill-length portraits, the camera can warn that heads or feet of the group are being cut off. In a fully-automatic mode, the camera may actually adjust zoom, or even pan-tilt controls, to adjust the composition The instant of exposure, or time-extent of a recorded video may also be controlled by image content. For instance, the device could wait until every person in the image is smiling (or give up and take a photograph after a predetermined "time-out" period), when everyone is facing the camera, when a car enters the frame, when the animal reaches its closest approach to the center of the image, video the whole period that the child is in the camera's field of view, etc.

Conventional cameras use auto-focus or automatic exposure control. Some have even provided modules designed for specific photographic situations. The present invention, however, goes far beyond these systems to set imaging parameters in a more intelligent manner based upon more detailed knowledge of the image content. Some examples are listed below, taken mainly from the domain of still or motion photography, but are also applicable or with easily understood corollaries in the domains of image acquisition by other means.

- Rather than set the focus based upon the depth of a single object located at a fixed location in the image, the present invention assesses the depths of all objects in the scene. Using a model of the type of scene photographed, the invention then makes a judgment as to which object is or could be the subject of the photograph and selectively keeps that in focus.
- Multiple objects are determined to be of interest and the aperture and focus settings are adjusted to give appropriate depth of field.
- Backlit scenes are detected and the flash triggered automatically, or alternatively, the user is queried to see if he prefers to expose the photograph for the whole scene instead of just for the foreground object.
- A night sky is recognized and exposure settings chosen accordingly.
- The scene analyzer detects human faces and sets the camera appropriately for portraits, groups, etc. For instance, when a face is closely framed by the user, the camera focuses on the face, chooses a narrow depth of field, and sets the exposure for the face region not for the dark/lightness of the background.
- A picture containing a person in front of a distant object at night may result in the camera prompting the user to select between a number of sensible types of photograph that might be intended, e.g:
  1. person only,
  2. background only, or
  3. background correct with fill-in flash (and red-eye reduction), to correctly expose the person and the background.
- Fast moving objects may be detected and high shutter speeds chosen automatically.
- A landscape may be detected and a dynamic controllable filter activated in the imaging system so that both sky and land are correctly illuminated (e.g., dimming of upper portion of the image corresponding to the sky).
- If objects with known color characteristics were detected, e.g., vegetation, color balance may be adjusted accordingly to achieve maximum resolution in the relevant part of the spectrum. Further, in medical imaging, the camera could detect that a particular body part was being imaged (e.g., the heart) and then change the frequency or direction of illuminant to obtain maximum contrast in the image. Since the heart is a moving object, imaging characteristics with high temporal resolution may also be chosen.

Furthermore, all of the extracted information can be recorded and used to control a subsequent rendering or reproduction phase. For instance, color information of the original scene can be used to limit the distortions of automatic color balancing on reproduction. Higher level information can also be stored and later used to index the images (e.g. scene classifications such as people, cars, foliage, landscape, night sky, etc.) without an additional indexing step as is presently required. Similarly, if the current scene classification is "ground", "grass", or "feet" a video camera could be automatically toggled to the pause mode and recording stopped.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A system for automatically setting image acquisition controls of a camera, comprising:
    a temporary image acquisition unit which acquires a temporary image;
    a scene analysis unit which extracts information from said temporary image and generates a scene classification from said extracted information;
    a photographic expert unit which adjusts image capture parameters based on said scene classification; and
    a permanent image acquisition unit which acquires a permanent image based on the image capture parameters adjusted by said photographic expert unit.

2. The system of claim 1, wherein the temporary image acquisition unit and the permanent image acquisition unit are a same unit.

3. The system of claim 1, further comprising:
    a user interface to prompt a user of the camera and to receive input from the user in response to user prompts, wherein the photographic expert unit optionally runs in a "guided mode" where the user is prompted with choices of a number of alternate settings.

4. The system of claim 3, wherein information corresponding to user-adjusted image capture parameters is supplied as feedback to the photographic expert unit through the user interface.

5. The system of claim 4, wherein mapping between input characteristics and image parameters is learned automatically by the photographic expert unit observing settings input by the user for different kinds of images.

6. The system of claim 1, wherein the photographic expert unit determines a subject based on extracted features within said scene classification.

7. The system of claim 6, wherein the photographic expert unit chooses a proper exposure for said subject determined.

8. The system of claim 7, wherein the photographic expert unit chooses a shutter speed and aperture combination based upon reflected light from said subject subject.

9. The system of claim 1, further comprising:
    an illumination device and wherein the photographic expert unit controls the illumination device to compensate for poor illumination.

10. The system of claim 9, wherein the photographic expert unit controls the illumination device to compensate for a back-lit subject.

11. The system of claim 1, wherein a focal-length of a lens is one of the image capture parameters.

12. The system of claim 1, wherein lighting of an imaged scene is analyzed by the photographic expert unit to determine exposure parameters of the acquired image.

13. The system of claim 1, wherein distances of multiple objects in an imaged scene are used by the photographic expert unit to estimate optimal or candidate focus depths.

14. The system of claim 1, wherein distances of objects in an imaged scene are used by The photogahic expert unit to estimate optimal or candidate settings for focus depth and aperture to obtain desirable depth of field characteristics.

15. The system of claim 1, wherein speeds of objects in an image are estimated and used by the photographic expert unit to determine optimal or candidate exposure speed settings.

16. The system of claim 1, wherein objects in the image are recognized and a style of photography is determined by the photographic expert unit based upon the objects.

17. The system of claim 1, wherein the photographic expert unit includes a storage medium for storing said extracted information.

18. The system of claim 17, wherein the extracted information includes at least one of image features, scene components, and imaging parameters.

19. The system of claim 17, wherein the stored information is used for indexing at a later time.

20. The system of claim 19, wherein the stored information includes time reference and duration of observed features.

21. The system of claim 1, wherein the extracted information includes image features based on one or more of the following: depth segmentation, motion segmentation, illumination evaluation, color analysis, geometric features, texture analysis, and scale determination.

22. The system of claim 1, wherein the extracted information includes scene components that include one or more of the following: human faces, people, buildings, vehicles, walls, furniture, vegetation, skyline, horizon, and ground plane.

23. The system of claim 1, wherein said scene classification is one of a portrait, close-up portrait, group shot, action photo, natural landscape, cityscape, still-life, macro close-up, crowd scene, backlit object, motor sports, sea scene, athletic event, stage performance, silhouette, flowers, architectural landmark, animal, and night sky.

24. The system of claim 1, wherein the image capture parameters include one or more of the following optical controls: focus distance, aperture, shutter speed, zoom or focal length, filter application, filter parameters and imager sensitivity.

25. The system of claim 1, wherein the scene analysis unit determines a subject region of the image.

26. The system of claim 25, wherein the scene analysis unit determines a subject region of the image based on one or more of the following: a flesh tone area, a geometric model of a face, an area with high motion, the closest region, and the most central region.

27. The system of claim 6, wherein said determined subject is a human face.

28. The system of claim 27, wherein color balance of the permanent image acquisition unit is altered to improve flesh tone color rendition in the face.

29. The system of claim 28, wherein the face is differentially exposed relative to the remainder of the image to improve contrast.

30. The system of claim 1, further comprising:
at least one auxiliary non-imaging sensor supplying an input into the scene analysis unit.

31. The system of claim 30, wherein the at least one auxiliary sensor includes one or more of the following: an accelerometer, a tilt sensor, an ambient light sensor, an ultraviolet light sensor, a temperature sensor, an optical triangulation unit, an ultrasonic range finder, an audio sensor, a motion sensor, a global positioning system and a compass.

32. The system of claim 1, further comprising:
a controllable mechanical pointing system coupled to the permanent image acquisition device.

33. The system of claim 1, wherein the photographic expert unit determines a shutter speed to eliminate blurring due to camera shake.

34. The system of claim 1, wherein the photographic expert unit determines an exact time at which to acquire the permanent image based on the scene classification.

35. The system of claim 1, further comprising:
a user interface which informs a user of the camera of the scene classification and allowing the user to either confirm this scene classification or override the photographic expert unit and choose a different scene classification.

36. The system of claim 35, wherein the scene analysis unit learns an improved mapping between the extracted features and said scene classification based on feedback from the user.

37. The system of claim 1, further comprising;
a user interface which informs a user of the camera of the image parameters selected and allows the user to optionally override these parameters.

38. The system of claim 1, further comprising:
a user interface which informs a user of the camera of anomalous situations and/or non-optimal settings.

39. The system of claim 1, wherein said scene analysis unit generates a plurality of hypotheses of scene classifications, and wherein said system further comprises:
a scene arbitration unit which selects said scene classification from said plurality of hypotheses of scene classifications.

40. The system of claim 39, wherein said scene arbitration unit selects said scene classification from said plurality of hypotheses of scene classifications based on one of a rulesbased, statistical, or neural network-based process.

41. The system of claim 40, wherein said rules-based or statistical process selecting said scene classification as an optimal one of said hypotheses of scene classifications based on said extracted information.

42. A computer implemented method for automatically setting image acquisition controls of a camera, said method comprising the steps of:
acquiring a temporary image;
extracting at least one of image features and scene components from said temporary image;
generating a scene classification from said at least one of the extracted image features and scene components;
adjusting image capture parameters based on the scene classification generated in said generating step; and
acquiring a permanent image based on the image capture parameters adjusted in said adjusting step.

43. The method of claim 42, further comprising:
prompting a user of the camera with choices of a number of alternate settings; and
receiving input from the user in response to user prompts, wherein the photographic expert unit optionally runs in a "guided mode."

44. The method of claim 43, further comprising: receiving user feedback to adjust image capture parameters.

45. The method of claim 44, further comprising:

automatically learning mapping between input characteristics and image parameters by observing settings input by the user for different kinds of images.

46. The method of claim 42, further comprising:

determining an intended subjected based on extracted features from the scene classification.

47. the method of claim 46, further comprising:

choosing a proper focus distance for a subject region of an image of the determined intended subject.

48. The method of claim 46, further comprising:

choosing a proper exposure for a subject region of an image of the determined intended subject.

49. The method of claim 48, further comprising:

choosing a shutter speed and aperture combination based upon reflected light from the determined intended subject.

50. The method of claim 42, further comprising:

generating a plurality of hypotheses of scene classifications; and selecting said scene classification from said plurality of hypotheses of scene classifications.

51. The method of claim 50, further comprising:

requesting a scene classification choice from a user of the camera.

52. The method of claim 50, wherein said scene classification is selected from said plurality of hypotheses of scene classifications based on one of a rules-based or statistical process.

53. The method of claim 42, further comprising:

saving said scene classification and imaging parameter information associated with an image.

54. The method of claim 52, wherein said rules-based or statistical process selects said scene classification as an optimal one of said hypotheses of scene classifications based on at least one of said extracted image features and scene components.

55. A system for automatically setting image acquisition controls of a camera, comprising:

a temporary image acquisition unit for acquiring a temporary image;

a permanent image acquisition unit with controllable image capture parameters for the acquisition of a permanent image;

a scene analysis unit for receiving input from the temporary image acquisition unit, extracting image features and scene components, and using these to generate a parameterized scene classification; and a photographic expert unit for receiving said scene classification from the scene analysis unit and generating as an output image capture parameters, wherein the photographic expert unit adjusts the image capture parameters of the permanent image acquisition unit based on the scene classification.

56. The system for automatically setting image acquisition controls of a camera as recited in claim 55, wherein the temporary image acquisition unit and the permanent image acquisition unit are same.

* * * * *